US011155121B2

(12) United States Patent
Fujimoto et al.

(10) Patent No.: US 11,155,121 B2
(45) Date of Patent: Oct. 26, 2021

(54) TIRE

(71) Applicant: Sumitomo Rubber Industries, Ltd., Kobe (JP)

(72) Inventors: Yuki Fujimoto, Kobe (JP); Yuki Kigami, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 625 days.

(21) Appl. No.: 15/977,566

(22) Filed: May 11, 2018

(65) Prior Publication Data

US 2018/0333993 A1    Nov. 22, 2018

(30) Foreign Application Priority Data

May 16, 2017 (JP) .............................. JP2017-097548
Apr. 4, 2018 (JP) .............................. JP2018-072534

(51) Int. Cl.
*B60C 11/12* (2006.01)
*B60C 11/01* (2006.01)
*B60C 11/03* (2006.01)

(52) U.S. Cl.
CPC .......... *B60C 11/1204* (2013.01); *B60C 11/01* (2013.01); *B60C 11/0302* (2013.01); *B60C 11/1236* (2013.01); *B60C 2011/0358* (2013.01); *B60C 2011/0383* (2013.01); *B60C 2011/0388* (2013.01); *B60C 2011/1213* (2013.01)

(58) Field of Classification Search
CPC ............. B60C 11/0302; B60C 11/1236; B60C 11/1204; B60C 11/01; B60C 2011/0388; B60C 2011/1213; B60C 2011/0383; B60C 2011/0358
See application file for complete search history.

(56) References Cited

U.S. PATENT DOCUMENTS

D615,479 S * 5/2010 Lee ............................... D12/552
D780,672 S * 3/2017 Yoon ............................ D12/563

FOREIGN PATENT DOCUMENTS

| EP | 2664464 A1 * | 11/2013 | ............. B60C 11/01 |
| EP | 3095621 A1 * | 11/2016 | ......... B60C 11/1236 |
| JP | 2016-196288 A | 11/2016 | |

* cited by examiner

*Primary Examiner* — Katelyn W Smith
*Assistant Examiner* — Philip N Schwartz
(74) *Attorney, Agent, or Firm* — Birch, Stewart, Kolasch & Birch, LLP

(57) ABSTRACT

A tire comprises a tread portion 2. The tread portion 2 comprises a plurality of first oblique grooves 10A extending obliquely from a first tread edge Te1 positioned on one side in a tire axial direction toward a tire equator C. Each of the first oblique grooves 10A comprises a main body portion 12 extending from the first tread edge Te1 without reaching the tire equator C and a branch portion 13 branching off from the main body portion 12 and extending to cross the tire equator. The branch portion 13 terminates without being connected with other grooves than the first oblique grooves 10A.

20 Claims, 8 Drawing Sheets

TIRE

TECHNICAL FIELD

The present invention relates to a tire capable of exerting excellent on-snow performance while maintaining steering stability on a dry road surface.

BACKGROUND ART

For example, Japanese Unexamined Patent Application No. 2016-196288 (Patent Literature 1) proposed a winter tire. The tread portion of the tire disclosed in Patent Literature 1 is provided with a plurality of oblique grooves extending obliquely from one of tread edges toward a tire equator. Each of the oblique grooves disclosed in Patent Literature 1 includes a main body portion extending from one of the tread edges without reaching the tire equator and a branch portion branching off from the main body portion and extending to cross the tire equator.

However, the branch portion disclosed in Patent Literature 1 is connected with another one of the oblique grooves extending from the other one of the tread edges. The branch portions configured as such decrease rigidity of a land region in the vicinity of the tire equator, therefore, it is possible that the steering stability on a dry road surface eventually decreases.

SUMMARY OF THE INVENTION

The present invention was made in view of the above, and a primary object thereof is to provide a tire capable of exerting excellent on-snow performance while maintaining the steering stability on a dry road surface.

In one aspect of the present invention, a tire comprises a tread portion comprising a plurality of first oblique grooves extending obliquely from a first tread edge positioned on one side in a tire axial direction toward a tire equator, wherein each of the first oblique grooves comprises a main body portion extending from the first tread edge without reaching the tire equator and a branch portion branching off from the main body portion and extending to cross the tire equator, and the branch portion terminates without being connected with other grooves than the first oblique grooves.

In another aspect of the invention, it is preferred that the tread portion further comprises a plurality of second oblique grooves extending from a second tread edge positioned on the other side in the tire axial direction toward the tire equator, the branch portion terminates before reaching the second oblique grooves, and a width of a spacing portion between an end portion of the branch portion and its adjacent one of the second oblique grooves is smaller than a groove width of the branch portion.

In another aspect of the invention, it is preferred that the spacing portion is provided with a sipe connecting between the branch portion and its adjacent one of the second oblique grooves and having a width less than 1.5 mm.

In another aspect of the invention, it is preferred that the tread portion further comprises a center land region, and the center land region extends continuously in a tire circumferential direction without being divided by a groove having a width more than 1.5 mm.

In another aspect of the invention, it is preferred that the main body portion comprises a tip portion terminating before reaching the tire equator, a tapered land region is defined at a corner portion located between the tip portion and the branch portion, and the tapered land region has a chamfered portion inclined inwardly in a tire radial direction toward the corner portion.

In another aspect of the invention, it is preferred that in a cross section of the tire passing through a rotational axis thereof, the tread portion comprises a ground contacting surface and buttress surfaces disposed on both outer sides in the tire axial direction of the ground contacting surface, and the ground contacting surface and each of the buttress surfaces are connected by an arcuate surface having a radius of curvature in a range of from 1 to 10 mm.

In another aspect of the invention, it is preferred that the tread portion is provided with a longitudinal sipe extending in the tire circumferential direction from the branch portion.

In another aspect of the invention, it is preferred that the longitudinal sipe has one end connected to the branch portion and the other end terminating without being connected with any other grooves and sipes.

In another aspect of the invention, it is preferred that the longitudinal sipe has a length in the tire circumferential direction smaller than the groove width of the branch portion.

In another aspect of the invention, it is preferred that a tip of the main body portion is inclined at an angle in a range of from 70 to 80 degrees with respect to the tire axial direction.

In another aspect of the invention, it is preferred that the tread portion further comprises a shoulder block defined between the plurality of the first oblique grooves and arranged closest to the first tread edge, the shoulder block is provided with a longitudinal closed sipe which extends in the tire circumferential direction and has both ends terminating within the block.

DESCRIPTION OF THE PREFERRED EMBODIMENT

An embodiment of the present invention will now be described in detail.

Figure 1:
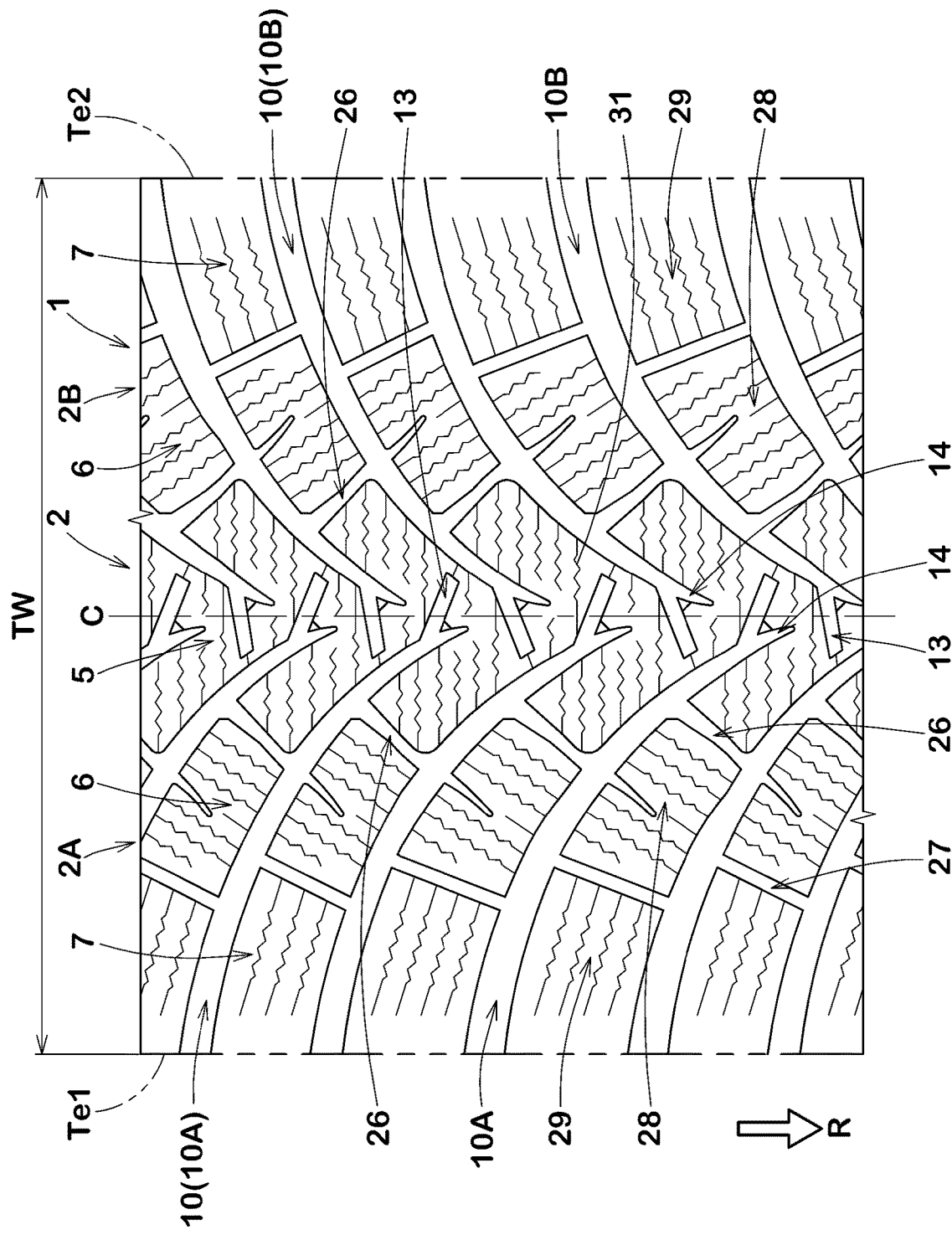
FIG. 1 is a development view of a tread portion of a tire as an embodiment of the present invention.

FIG. 1 is a development view of a tread portion 2 of a tire 1 in this embodiment. As shown in FIG. 1, the tire 1 in this embodiment is suitably used as a winter tire for a passenger car, for example. In another embodiment of the present invention, the tire 1 can be used as a pneumatic tire for heavy load, a non-pneumatic tire not filled with pressurized air inside the tire, or the like, for example.

The tire 1 in this embodiment is provided with a directional pattern in which a rotational direction R is specified, for example. The rotational direction R is indicated by letters or symbols on a sidewall portion (not shown).

The tire 1 in this embodiment is provided with the tread portion 2 positioned between a first tread edge Te1 and a second tread edge Te2. The tread portion 2 includes a first tread portion 2A positioned between a tire equator C and the first tread edge Te1 and a second tread portion 2B positioned between the tire equator C and the second tread edge Te2.

In a case of a pneumatic tire, the first tread edge Te1 and the second tread edge Te2 are defined as outermost ground contacting positions in the tire axial direction of the tire 1 when the tire 1 in a standard state is in contact with a flat surface with zero camber angle by being loaded with a standard tire load. The standard state is a state in which the tire is mounted on a standard rim, inflated to a standard pressure, and loaded with no tire load. In this specification, dimensions and the like of various parts of the tire are those measured under the standard state, unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

The "standard load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

The tread portion 2 is provided with a plurality of first oblique grooves 10A and a plurality of second oblique grooves 10B (hereinafter they may be simply referred to as "oblique grooves 10"). The first oblique grooves 10A extend obliquely from the first tread edge Te1 toward the tire equator C. The second oblique grooves 10B extends obliquely from the second tread edge Te2 toward the tire equator C. The second oblique grooves 10B has substantially the same configuration as the first oblique grooves 10A. Thereby, unless otherwise noted, the configuration of the first oblique grooves 10A can be applied to the second oblique grooves 10B.

Figure 2:
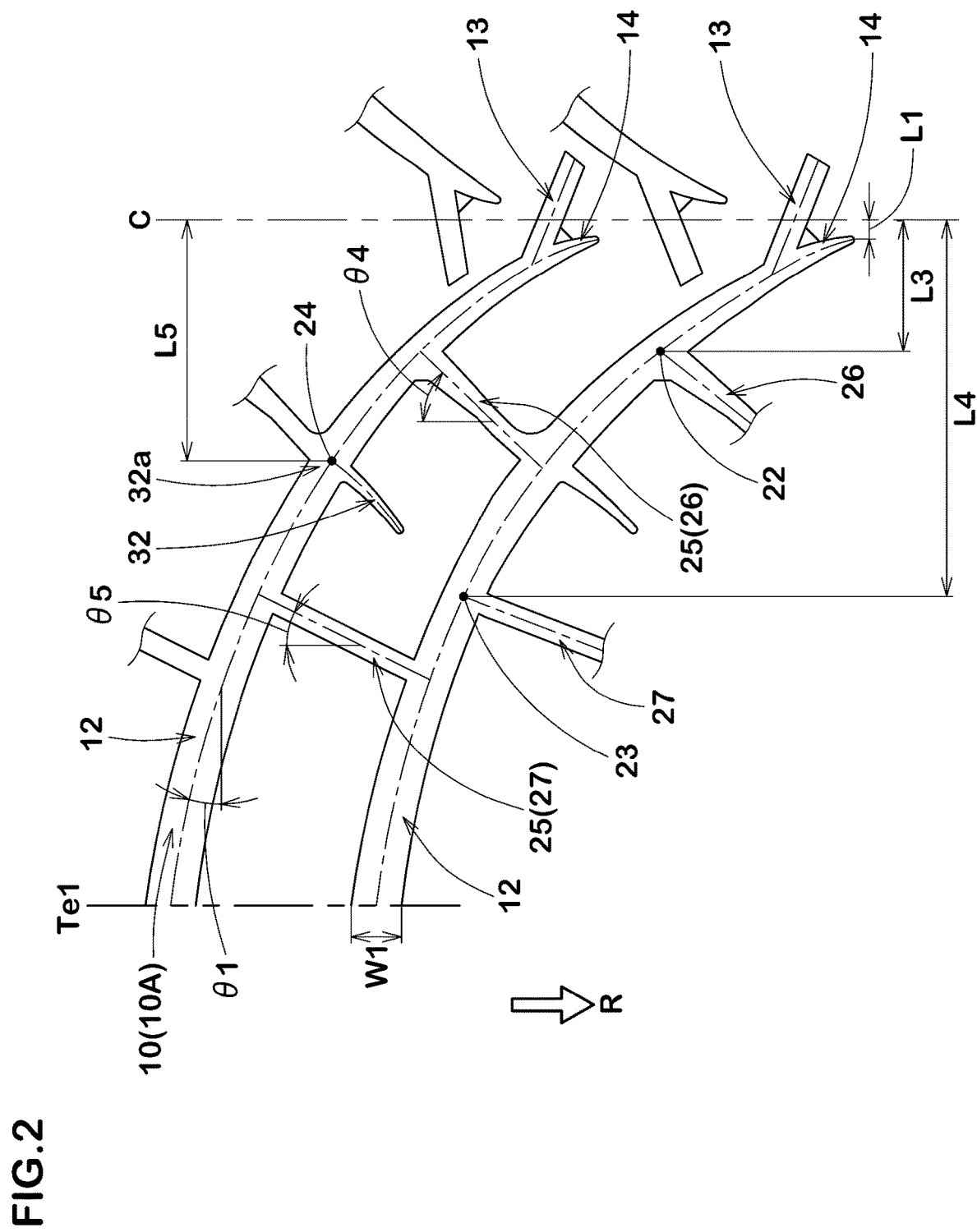
FIG. 2 is an enlarged view of contours of first oblique grooves of FIG. 1.

FIG. 2 is an enlarged view of contours of the first oblique grooves 10A. As shown in FIG. 2, each of the first oblique grooves 10A includes a main body portion 12 and a branch portion 13. The main body portion 12 extends from the first tread edge Te1 without reaching the tire equator. The branch portion 13 branches off from the main body portion 12 and extends to cross the tire equator C. First oblique grooves 10A forms long snow blocks extending obliquely with respect to a tire axial direction during running on a snowy road surface. In particular, during running on a snowy road surface, large ground contact pressure is applied to the branch portions 13 which cross the tire equator, therefore, harder snow blocks are formed. The first oblique grooves 10A shear the snow blocks, therefore, it is possible that large on-snow traction is obtained.

It is preferred that each of the main body portions 12 is inclined toward heel-side in the rotational direction R from the first tread edge Te1 to the tire equator C, for example. In a preferred embodiment, each of the main body portions 12 is curved such that an angle θ1 thereof with respect to the tire axial direction gradually increases toward the tire equator C. It is preferred that the angle θ1 is in a range of from 5 to 75 degrees, for example. The oblique grooves 10 configured as such can exert snow block shearing force also in the tire axial direction during running on a snowy road.

Each of the main body portions 12 includes a tip portion 14 which terminates before reaching the tire equator C, for example. It is preferred that a distance L1 in the tire axial direction between an end of the tip portion 14 (that is, an end of a groove center line of the tip portion) and the tire equator is in a range of from 1.0% to 3.0% of a tread width TW (shown in FIG. 1, and the same applies hereinafter), for example. The tread width TW is a distance in the tire axial direction of the tire in the standard state between the first tread edge Te1 and the second tread edge Te2.

It is preferred that each of the main body portions 12 has a groove width gradually increasing toward the first tread edge Te1, for example. It is preferred that a maximum groove width w1 of each of the main body portion 12 is in a range of from 2.5% to 4.5% of the tread width TW, for example. In the case of a winter tire for a passenger car, a depth of each of the main body portions 12 is in a range of from 7.0 to 11.0 mm, preferably from 8.0 to 9.0 mm, for example.

Each of the branch portions 13 terminates without being connected with other grooves than the respective first oblique groove 10A. Here, the "other grooves" means those having a width not less than 1.5 mm, and sipes having a width less than 1.5 mm are excluded. The branch portions 13 configured as such suppress decrease in the rigidity of a land region near the tire equator C while obtaining the on-snow traction as described above, therefore, it is possible that the steering stability on a dry road surface is maintained eventually.

Figure 3:
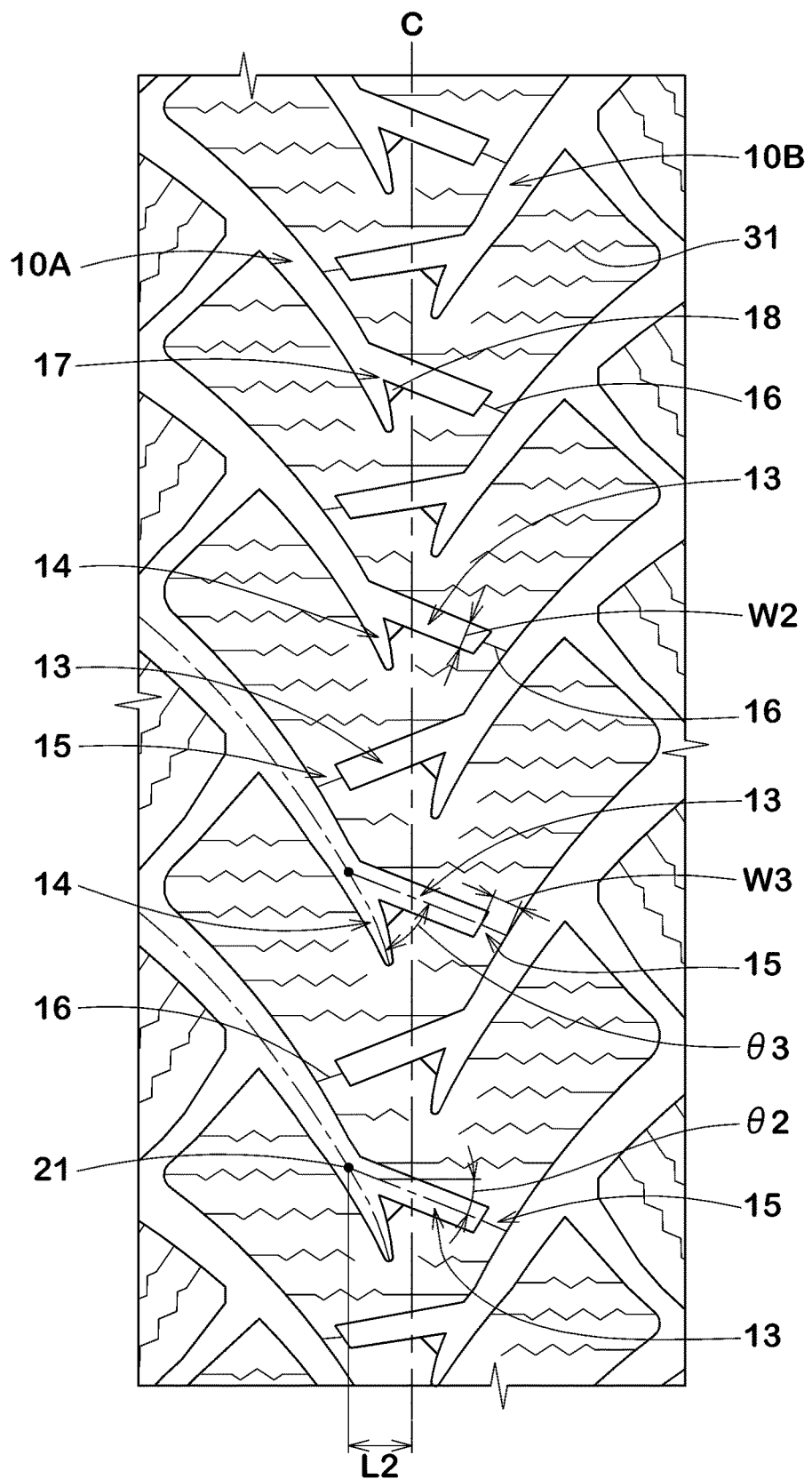
FIG. 3 is an enlarged view of tip portions and branch portions of the oblique grooves of FIG. 1.

FIG. 3 is an enlarged view showing the tip portions 14 and the branch portions 13 of the oblique grooves 10. As shown in FIG. 3, in this embodiment, the branch portions 13 of the first oblique grooves 10A and the branch portions 13 of the second oblique grooves 10B are arranged alternately in a tire circumferential direction. Each of the branch portions 13 of the first oblique grooves 10A terminates before reaching its adjacent one of the second oblique grooves 10B, for example. Each of the branch portions 13 of the second oblique grooves 10B terminates before reaching its adjacent one of the first oblique grooves 10A, for example.

In order to improve the on-snow traction and cornering performance on a snowy road surface in a good balance, it is preferred that each of the branch portions 13 is arranged at an angle θ2 in a range of from 15 to 30 degrees with respect to the tire axial direction, for example. In a more preferred embodiment, it is preferred that, in each of the oblique grooves, an angle θ3 between a groove centerline of the branch portion 13 and the groove centerline of the tip portion 14 is in a range of from 35 to 45 degrees, for example.

An intersection point of the groove center line of the main body portion 12 and an extension line of the groove center line of the branch portion 13 is defined as a first intersection point 21. It is preferred that a distance L2 in the tire axial direction between the first intersection point 21 and the tire equator C is in a range of from 3.0% to 5.0% of the tread width TW, for example. The branch portions 13 configured as such are useful for improving the steering stability on a dry road surface and the on-snow performance in a good balance.

From a similar point of view, it is preferred that each of the branch portions 13 has a groove width w2 in a range of from 0.50 to 0.60 times the maximum groove width w1 (shown in FIG. 2) of each of the main body portions 12, for example.

It is preferred that, in each of the oblique grooves, the branch portion 13 has a smaller depth than the main body portion 12, for example. Specifically, it is preferred that the depth of the branch portion 13 is in a range of from 5.0 to 10.0 mm, for example. The branch portions 13 configured as such are helpful for maintaining the steering stability on a dry road surface.

It is preferred that a width w3 of each of spacing portions 15 between an end portion of each of the branch portions 13 and its adjacent one of the second oblique grooves 10B is smaller than the groove width w2 of each of the branch portions 13, for example. Specifically, it is preferred that the width w3 of each of the spacing portions 15 is in a range of from 0.70 to 0.90 times the groove width w2 of each of the branch portions 13, for example. Thereby, the spacing portions 15 are moderately deformed while obtaining the above-mentioned effects, therefore, clogging of snow in the branch portions 13 is suppressed during running on a snowy road.

In a more preferred embodiment, it is preferred that each of the spacing portions 15 is provided with a sipe 16 connecting between the branch portion 13 and its adjacent one of the second oblique grooves 10B. Note that, in this specification, the term "sipe" means a cut or a slit having a width of less than 1.5 mm. It is possible that the sipes 16 suppress clogging of snow in the branch portions 13 during running on a snowy road. In an embodiment like this, as compared with an embodiment in which the branch portions 13 are connected with the second oblique grooves 10B, it is possible that the on-snow performance is maintained over a long period of time.

For each of the oblique grooves, a tapered land region is defined at a corner portion 17 between the tip portion 14 and the branch portion 13. It is preferred that each of the tapered land regions is provided with a chamfered portion 18 inclined inwardly in a tire radial direction toward its adjacent one of the corner portions 17. It is preferred that each of the chamfered portions 18 is inclined at an angle (not shown) in a range of from 40 to 50 degrees with respect to the tire radial direction, for example. In this embodiment, owing to the configuration having the branch portions 13 terminating without being connected and the chamfered portions 18, as compared with an embodiment in which the branch portions 13 are connected with the second oblique grooves 10B, it is possible that uneven wear of the land region near the tire equator C is effectively suppressed.

As shown in FIG. 2, in a preferred embodiment, a plurality of joint grooves 25 each connecting between a pair of the oblique grooves 10 adjacent to each other in the tire circumferential direction are provided. It is preferred that each of the joint grooves 25 is inclined in the opposite direction to the oblique grooves 10, for example. In other words, it is preferred that each of the joint grooves 25 is inclined toward the tire equator C in a direction opposite to the rotational direction R.

The joint grooves 25 include first joint grooves 26 and second joint grooves 27, for example. The first joint grooves 26 are provided closest to the tire equator C among the plurality of the joint grooves 25 each arranged between adjacent oblique grooves 10, for example. The second joint grooves 27 are arranged on an outer side in the tire axial direction of the first joint grooves 26. The second joint grooves 27 in this embodiment are provided closest to the first tread edge Te1 among the plurality of the joint grooves 25, for example.

An intersection point of a groove center line of each of the oblique grooves 10 and an extension line of a groove center line of one of the first joint grooves 26 connected with the each of the oblique grooves 10 on the heel-side in the rotational direction R is defined as a second intersection point 22. It is preferred that a distance L3 in the tire axial direction between the tire equator C and each of the second intersection point 22 is in a range of from 0.08 to 0.12 times the tread width TW, for example.

It is preferred that each of the first joint grooves 26 is inclined at an angle θ4 in a range of from 35 to 45 degrees with respect to the tire circumferential direction, for example. The first joint grooves 26 configured as such can provide the snow block shearing force in the tire circumferential direction and the tire axial direction in a good balance.

An intersection point of the groove center line of each of the oblique grooves 10 and an extension line of a groove center line of one of the second joint grooves 27 connected with the each of the oblique grooves 10 on the heel-side in the rotational direction R is defined as a third intersection point 23. It is preferred that a distance L4 in the tire axial direction between the tire equator C and each of the third intersection points 23 is in a range of from 0.22 to 0.35 times the tread width TW, for example.

It is preferred that each of the second joint grooves 27 is inclined at an angle θ5 smaller than that of each of the first joint grooves 26 with respect to the tire circumferential direction, for example. Specifically, it is preferred that the angle θ5 with respect to the tire circumferential direction of each of the second joint grooves 27 is in a range of from 20 to 30 degrees, for example. Thereby, the cornering performance on a snowy road surface is further improved.

As shown in FIG. 1, the tread portion 2 has a center land region 5, middle block rows 6, and shoulder block rows 7 by the above-described grooves provided therein, for example. The center land region 5 is provided at a center portion in the tire axial direction of the tread portion 2. The center land region 5 in this embodiment is defined between the plurality of the first oblique grooves 10A and the first joint grooves 26 connecting therebetween, the plurality of the second oblique grooves 10B and the first joint grooves 26 connecting therebetween, for example.

It is preferred that the center land region 5, due to the above-described branch portions 13 provided therein, extends continuously in the tire circumferential direction without being divided by a groove having a width more than 1.5 mm, for example. In the center land region 5 configured as such, excessive deformation thereof is suppressed, therefore, it is helpful for improving the steering stability on a dry road surface.

It is preferred that the center land region 5 is provided with a plurality of center sipes 31 extending in a zigzag manner in the tire axial direction, for example. The center sipes 31 configured as such can provide high traction by edges thereof on a road surface covered with strongly compacted snow (hereinafter may be referred to as "compacted snow road surface"), for example.

Figure 4:
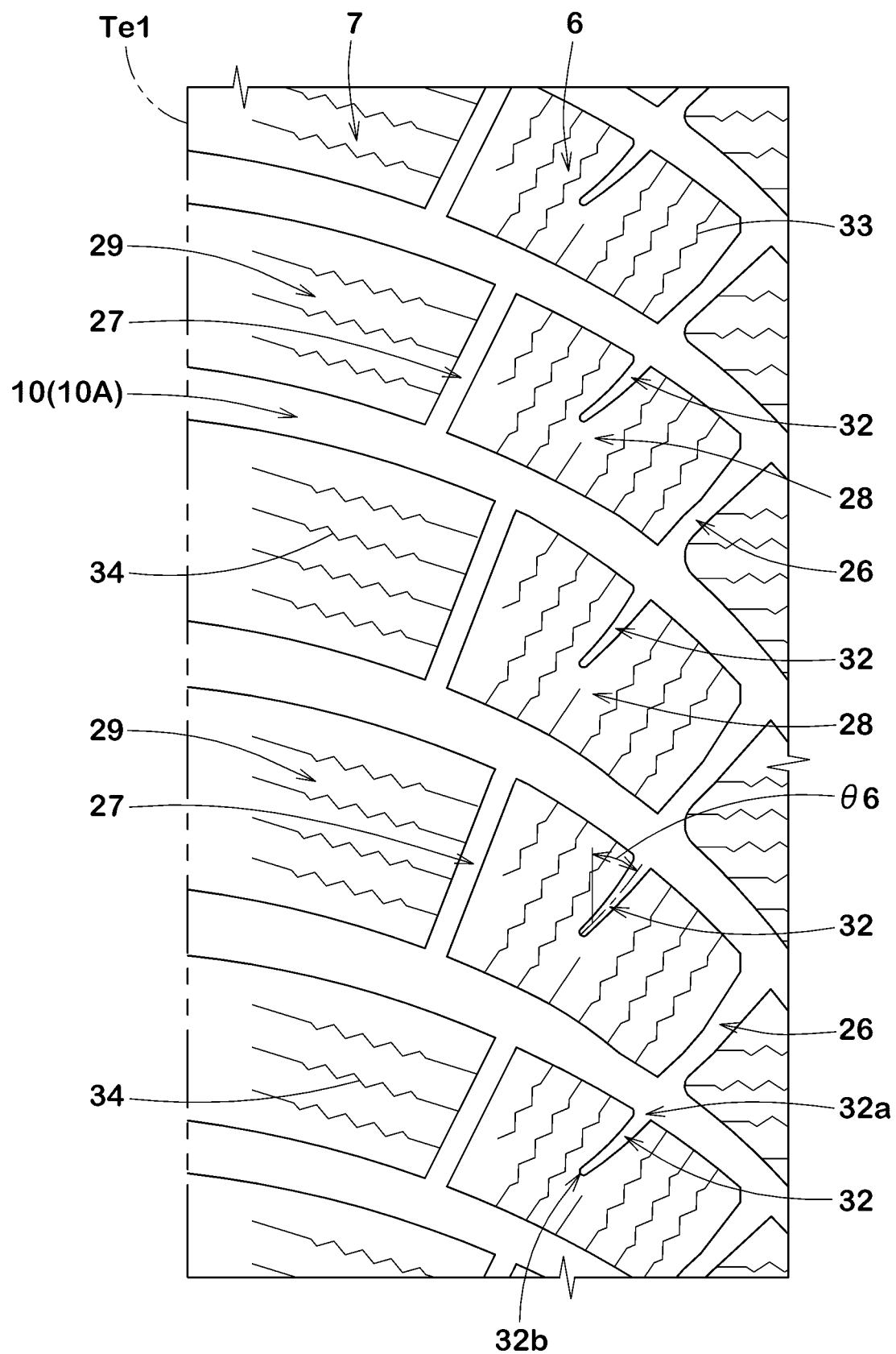
FIG. 4 is an enlarged view of one of middle block rows and one of shoulder block rows of FIG. 1.

FIG. 4 is an enlarged view of one of the middle block rows 6 and one of the shoulder block rows 7. As shown in FIG. 4, in each of the middle block rows 6, a plurality of middle blocks 28 are arranged in the tire circumferential direction. Each of the middle blocks 28 is defined between the first joint groove 26 and the second joint groove 27 between a pair of the oblique grooves adjacent to each other in the tire circumferential direction.

It is preferred that each of the middle blocks 28 is provided with a lateral groove 32, for example. In each of the middle blocks 28, one end 32a of the lateral groove 32 is connected with one of the oblique grooves 10 positioned on a toe-side in the rotational direction R of the middle block 28, for example. Further, the other end 32b of the lateral groove 32 terminates within the middle block 28. The lateral grooves 32 configured as such can improve the on-snow performance while maintaining the steering stability on a dry road surface by suppressing decrease in the rigidity of the middle blocks 28.

It is preferred that each of the lateral grooves 32 extends so as to be smoothly connected with its adjacent one of the first joint grooves 26 with its adjacent one of the oblique grooves 10 therebetween, for example. The expression "smoothly connected" includes an embodiment in which an extension of the first joint groove 26 in a longitudinal direction thereof intersects with at least a part of an end portion on a side of the lateral groove 32 of the oblique groove 10.

It is preferred that the lateral grooves 32 are inclined in the same direction as the first joint grooves 26, for example. It is preferred that each of the lateral grooves 32 is inclined at an angle θ6 in a range of from 30 to 50 degrees with respect to the tire circumferential direction, for example. The lateral grooves 32 configured as such promote deformation of the middle blocks 28, therefore, it is possible that clogging of snow in the oblique grooves 10 and each of the joint grooves 25 is suppressed eventually.

As shown in FIG. 2, an intersection point of a groove center line of each of the lateral grooves 32 on a side of the one end 32a and an extension line of the groove center line of its adjacent one of the oblique grooves 10 is defined as a fourth intersection point 24. It is preferred that a distance L5 in the tire axial direction between the tire equator C and each of the fourth intersection points 24 is in a range of from 0.15 to 0.20 times the tread width TW, for example.

As shown in FIG. 4, it is preferred that each of the middle blocks 28 is provided with a plurality of middle sipes 33 extending in a zigzag manner along the joint grooves 25, for example. The middle sipes 33 configured as such can improve the traction and the cornering performance on a compacted snow road surface.

In each of the shoulder block rows 7, a plurality of shoulder blocks 29 is arranged in the tire circumferential direction. Each of the shoulder blocks 29 is defined on an outer side in the tire axial direction of the second joint groove 27 between a pair of the oblique grooves 10 adjacent to each other in the tire circumferential direction.

It is preferred that each of the shoulder blocks 29 is provided with a plurality of shoulder sipes 34 that are inclined in the opposite direction to the middle sipes 33 and extend in a zigzag manner, for example. Thereby, the middle blocks 28 and the shoulder blocks 29 are easily deformed in different directions, therefore, clogging of snow in each of the grooves is suppressed eventually.

Figure 5:
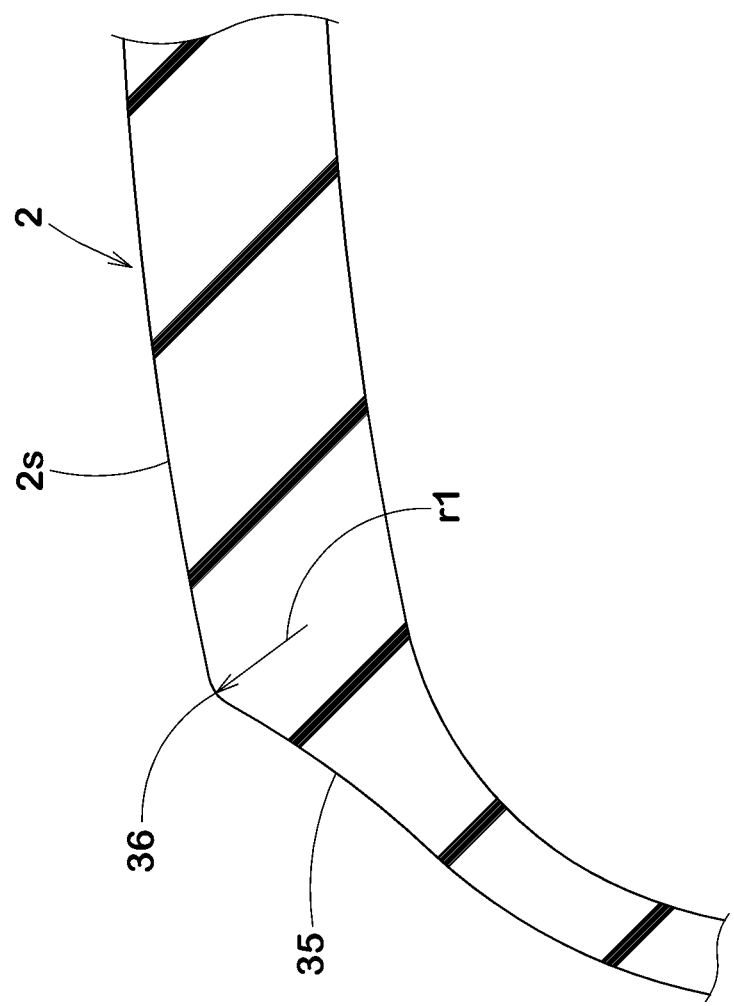
FIG. 5 is an enlarged partial view of a cross section of the tire passing through a rotational axis thereof.

FIG. 5 is an enlarged partial view of a cross section of the tire passing through a rotational axis thereof. As shown in FIG. 5, the tread portion 2 includes a ground contacting surface 2s and buttress surfaces 35 disposed on both outer sides in the tire axial direction of the ground contacting surface. In a preferred embodiment, the ground contacting surface 2s and each of the buttress surfaces 35 are connected by an arcuate surface 36 having a radius of curvature r1 in a range of from 1 to 10 mm. Thereby, it is possible that a large area, which can contact with the ground, of the tread portion 2 is secured, therefore, it is possible that the cornering performance on a dry road surface and on an icy road surface is improved, for example.

As shown in FIG. 1, a land ratio Lr of the tread portion 2 in this embodiment is preferably not less than 60%, more preferably not less than 65%, and preferably not more than 80%, more preferably not more than 75%. Thereby, the steering stability on a dry road surface and the on-snow performance are improved in a good balance. In this specification, the term "land ratio" means a ratio Sb/Sa of a total area Sa of an imaginary ground contacting surface obtained by filling all the grooves and the sipes and the actual total ground contacting area Sb.

From the similar point of view, rubber hardness Ht of a tread rubber forming the tread portion 2 is preferably not less than 45 degrees, more preferably not less than 55 degrees, and preferably not more than 70 degrees, more preferably not more than 65 degrees. In this specification, the term "rubber hardness" means hardness measured by a type-A durometer under an environment of 23 degrees Celsius in accordance with Japanese Industrial Standard JIS-K 6253.

Figure 7:
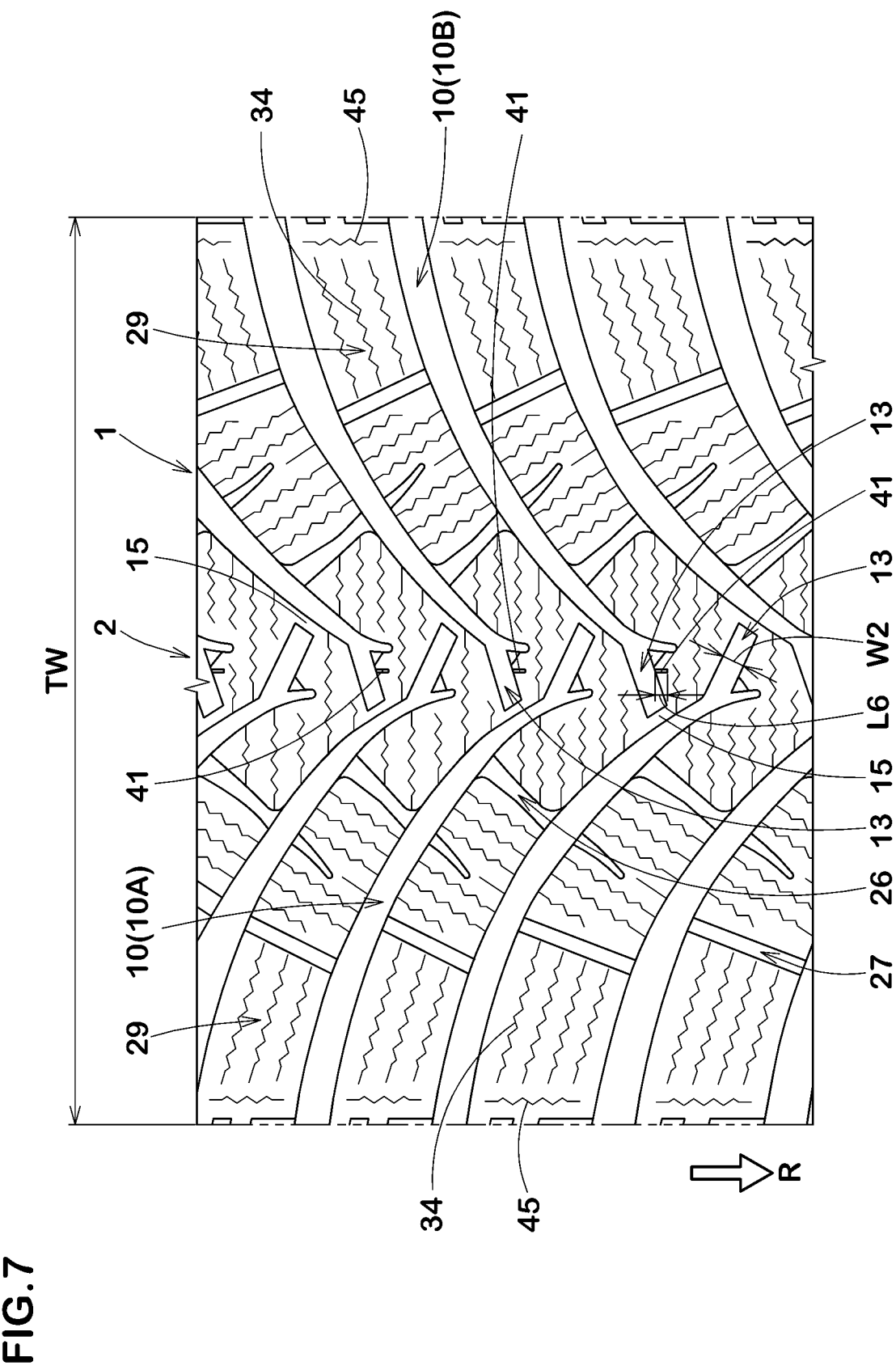
FIG. 7 is a development view of the tread portion of a tire according to another embodiment of the present invention.

FIG. 7 is a development view of the tread portion 2 of the tire 1 according to another embodiment of the present invention. In FIG. 7, the same reference numerals are given to the elements common to the above-described embodiment, and the explanation thereof is omitted here.

As shown in FIG. 7, the tread portion 2 in this embodiment is provided with longitudinal sipes 41 each extending in the tire circumferential direction from respective one of the branch portions 13. The longitudinal sipes 41 configured as such make it easy for the branch portions 13 to moderately deform, therefore, it is possible that clogging of snow in the branch portions 13 during running on a snowy road is suppressed.

In this embodiment, the oblique grooves connected with the longitudinal sipes 41 and the oblique grooves not connected with the longitudinal sipes 41 are arranged alternately in the tire circumferential direction. Such arrangement of the longitudinal sipes 41 can improve the steering stability on a dry road surface and the on-snow performance in a good balance. However, it is not limited to such an embodiment, and the longitudinal sipes 41 may be connected to all oblique grooves.

It is preferred that each of the longitudinal sipes 41 has one end connected to one of the branch portions 13 and the other end terminating without being connected with any other grooves and sipes, for example. In a further preferred embodiment, it is preferred that the longitudinal sipes 41 are provided on the tire equator C (not shown in FIG. 7). The longitudinal sipes 41 configured as such can improve the cornering performance on ice by edges thereof while maintaining the rigidity of the land region.

It is preferred that each of the longitudinal sipes 41 has a length in the tire circumferential direction smaller than the groove width w2 of each of the branch portions 13, for example. Specifically, it is preferred that a length L6 in the tire circumferential direction of each of the longitudinal sipes 41 is in a range of from 0.50 to 0.70 times the groove width W2 of each of the branch portions 13.

In this embodiment, it is preferred that sipes are not provided in the spacing portions 15. Thereby, the steering stability on a dry road surface is maintained.

Figure 8:
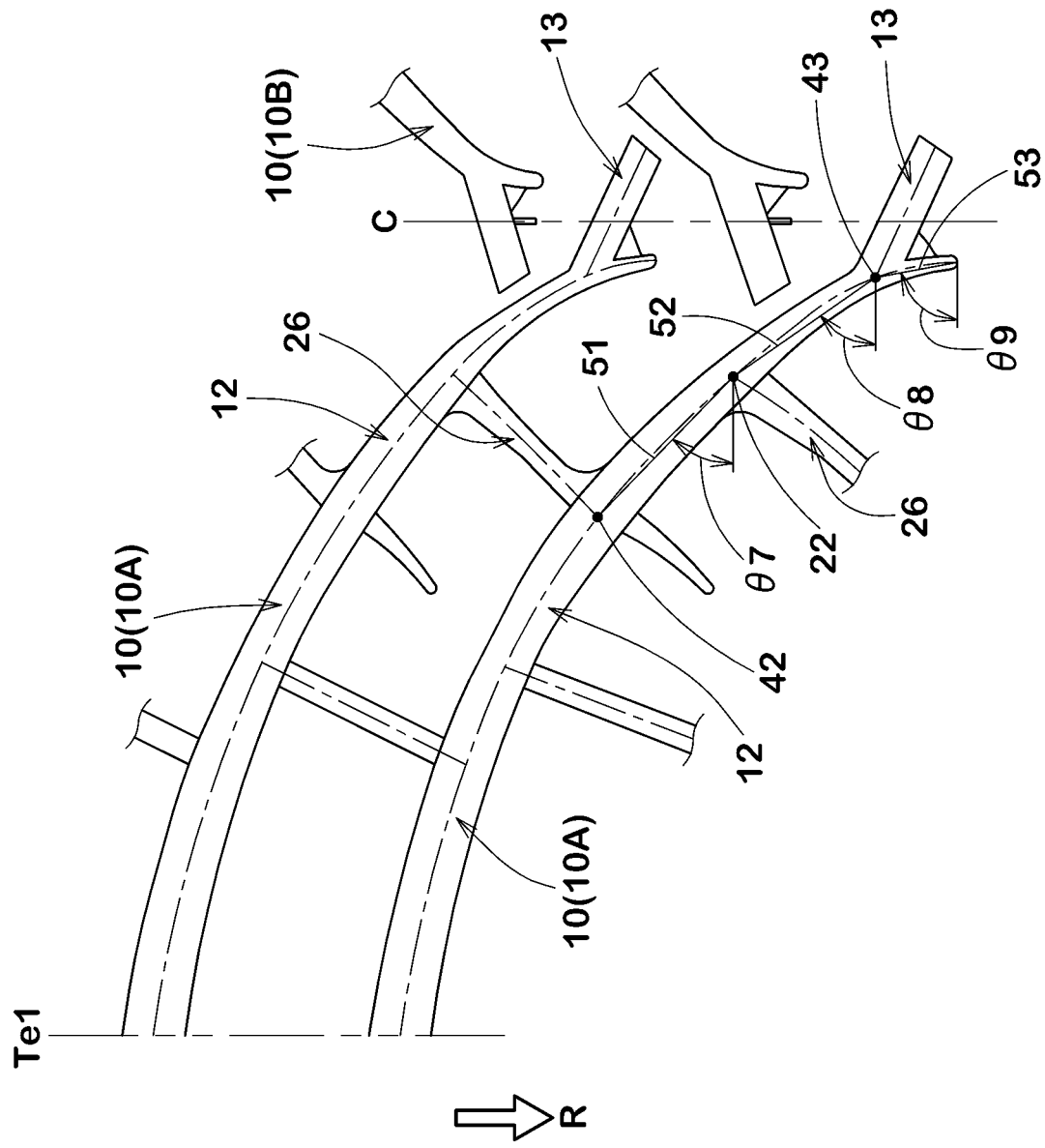
FIG. 8 is an enlarged view of contours of the first oblique grooves of FIG. 7.

FIG. 8 is an enlarged view of contours of the first oblique grooves 10A in the embodiment shown in FIG. 7. In this embodiment, an intersection point of a groove center line of each of the first oblique grooves 10A and a groove center line of one of the first joint grooves 26 connected with the each of the first oblique grooves 10A on the toe-side in the rotational direction R is defined as a fifth intersection point 42. An intersection point of the groove center line of each of the first oblique grooves 10A and the groove center line of one of the first joint grooves 26 connected with the each of the first oblique grooves 10A on the heel-side in the rotational direction R is defined as a second intersection point 22. It is preferred that an angle θ7 of a first straight line 51 extending between the fifth intersection point 42 and the second intersection point 22 with respect to the tire axial direction is in a range of from 35 to 45 degrees, for example.

In each of the first oblique grooves 10A, an intersection point of a groove center line of the main body portion 12 and a groove center line of the branch portion 13 is defined as a sixth intersection point 43. It is preferred that an angle θ8 of a second straight line 52 extending between the second intersection point 22 and the sixth intersection point 43 with respect to the tire axial direction is larger than the angle θ7. More specifically, it is preferred that the angle θ8 is in a range of from 45 to 55 degrees. The first oblique grooves 10A configured as such can improve the on-snow traction and the cornering performance in a good balance.

It is preferred that an angle θ9 with respect to the tire axial direction of a third straight line 53 extending between the sixth intersection point 43 and an end of the main body portion 12 of respective one of the first oblique grooves 10A is larger than the angle θ8. Specifically, it is preferred that the angle θ9 is in a range of from 70 to 80 degrees. In other words, a tip of each of the main body portions 12 is inclined at an angle in a range of from 70 to 80 degrees with respect to the tire axial direction. The main body portions 12 configured as such form snow blocks extending in the tire circumferential direction by the tips thereof, therefore, the cornering performance on a snowy road is improved. Further, by arranging the tips at the angle as described above, snow in the main body portions 12 is easily discharged from the tips during running on snow, therefore, excellent on-snow performance is continuously exerted.

As shown in FIG. 7, the shoulder blocks 29 in this embodiment are provided with longitudinal closed sipes 45 each of which extends in the tire circumferential direction and has both ends terminating within the respective block. It is preferred that the longitudinal closed sipes 45 are provided between the shoulder sipes 34 and the first tread edge Te1, for example. As a further preferred embodiment, the longitudinal closed sipes 45 in this embodiment extend in a zigzag manner. The longitudinal closed sipes 45 configured as such can moderate the behavior upon starting as well as suppress a sideslip on ice.

While detailed description has been made of the tire as an embodiment of the present invention, the present invention can be embodied in various forms without being limited to the illustrated embodiment.

Working Examples (Examples)

Figure 6:
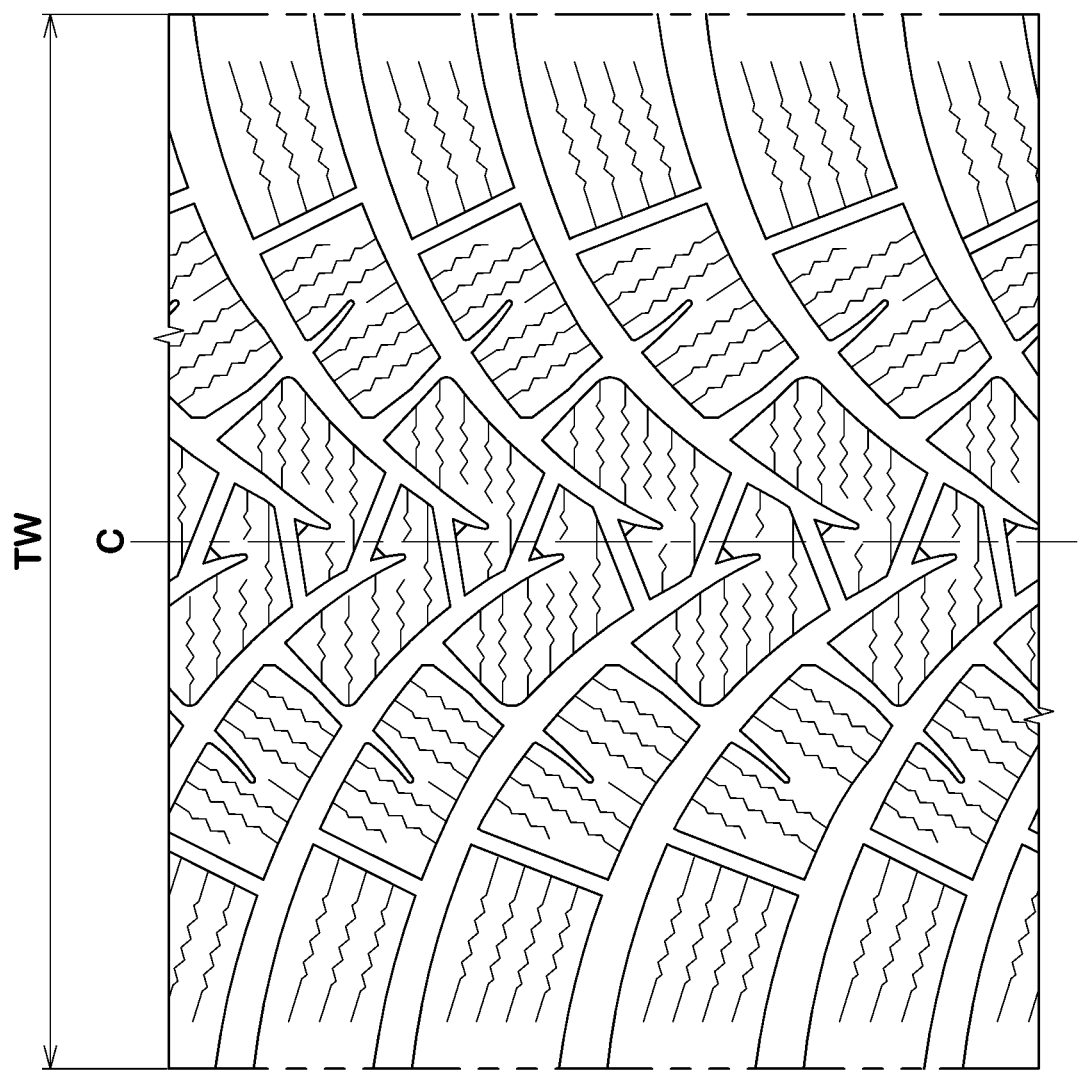
FIG. 6 is a development view of the tread portion of a tire as Reference.

Tires of size 205/55R16 having the basic structure shown in FIG. 1 were made by way of test according to the specification listed in Table 1. As a Reference, as shown in FIG. 6, a winter tire in which each of the branch portions is connected with its adjacent one of the oblique grooves was made by way of test. Each of the test tires was tested for the steering stability on a dry road surface and the on-snow performance. Common specifications of the test tires and the test methods are as follows.

Test car: displacement of 1800 cc
Test tire mounting position: all wheels
Tire rim: 16×7.0
Tire inner pressure: front wheels 220 kPa, rear wheels 220 kPa
Tread ground contacting width: 172 mm
Groove depth of oblique grooves: 8.5 mm
Land ratio: 70%
Rubber hardness of tread rubber: 52
<Steering Stability on a Dry Road Surface>
While the driver was driving the test car on a dry road surface of a circuit course, the steering stability was evaluated by the driver's feeling. The results are indicated by an evaluation point based on the Reference being 100, wherein the larger the numerical value, the better the steering stability on a dry road surface is.
<On-Snow Performance>
While the driver was driving the test car on a snowy road surface, running performance was evaluated by the driver's feeling. The results are indicated by an evaluation point based on the Reference being 100, wherein the larger the numerical value, the better the on-snow performance is. The test results are shown in Table 1.

TABLE 1

| Figure showing Tread pattern | Ref. FIG. 6 | Ex. 1 FIG. 1 | Ex. 2 FIG. 1 | Ex. 3 FIG. 1 | Ex. 4 FIG. 1 | Ex. 5 FIG. 1 | Ex. 6 FIG. 1 | Ex. 7 FIG. 1 |
|---|---|---|---|---|---|---|---|---|
| Angle θ2 of Branch portion | 23 | 23 | 15 | 20 | 25 | 30 | 23 | 23 |
| Width W3 of spacing portion/ Groove width W2 of Branch portion | — | 0.80 | 0.80 | 0.80 | 0.80 | 0.80 | 0.70 | 0.75 |
| Presence or absence of sipe in Spacing portion | — | presence | presence | presence | presence | presence | presence | presence |
| Radius of curvature r1 of Arcuate surface between Ground contacting surface and Buttress surface [mm] | 3.0 | 3.0 | 3.0 | 3.0 | 3.0 | 3.0 | 3.0 | 3.0 |
| Steering stability on Dry road surface [evaluation point] | 100 | 108 | 107 | 108 | 107 | 105 | 104 | 105 |
| On-snow performance [evaluation point] | 100 | 100 | 101 | 100 | 100 | 98 | 102 | 101 |

| Figure showing Tread pattern | Ex. 8 FIG. 1 | Ex. 9 FIG. 1 | Ex. 10 FIG. 1 | Ex. 11 FIG. 1 | Ex. 12 FIG. 1 | Ex. 13 FIG. 1 | Ex. 14 FIG. 1 |
|---|---|---|---|---|---|---|---|
| Angle θ2 of Branch portion | 23 | 23 | 23 | 23 | 23 | 23 | 23 |
| Width W3 of Spacing portion/ Groove width W2 of Branch portion | 0.85 | 0.90 | 0.80 | 0.80 | 0.80 | 0.80 | 0.80 |

TABLE 1-continued

| | | | | | | | |
|---|---|---|---|---|---|---|---|
| Presence or absence of sipe in Spacing portion | presence | presence | absence | presence | presence | presence | presence |
| Radius of curvature r1 of Arcuate surface between Ground contacting surface and Buttress surface [mm] | 3.0 | 3.0 | 3.0 | 1.0 | 5.0 | 10.0 | 15.0 |
| Steering stability on Dry road surface [evaluation point] | 108 | 108 | 108 | 108 | 108 | 107 | 105 |
| On-snow performance [evaluation point] | 99 | 99 | 98 | 100 | 100 | 100 | 100 |

From the test results, it was confirmed that the tires as Examples exerted excellent steering stability on a dry road surface as compared with the winter tire as the Reference. Further, it was confirmed that the tires as the Examples had the on-snow performance as same level as that of the winter tire as the Reference.

Tires of size 205/55R16 having the basic structure shown in FIG. 7 were made by way of test according to the specification listed in Table 2. As a Reference, as shown in FIG. 6, a winter tire in which each of the branch portions is connected with its adjacent one of the oblique grooves was made by way of test. Each of the test tires was tested for the steering stability on a dry road surface and the on-snow performance. Common specifications of the test tires and the test methods are the same as above.

The test results are shown in Table 2.

TABLE 2

| Figure showing Tread pattern | Ref. FIG. 6 | Ex. 15 FIG. 7 | Ex. 16 FIG. 7 | Ex. 17 FIG. 7 | Ex. 18 FIG. 7 | Ex. 19 FIG. 7 | Ex. 20 FIG. 7 | Ex. 21 FIG. 7 |
|---|---|---|---|---|---|---|---|---|
| Angle θ2 of Branch portion | 23 | 23 | 23 | 23 | 23 | 23 | 23 | 23 |
| Width W3 of Spacing portion/ Groove width W2 of Branch portion | — | 0.80 | 0.80 | 0.80 | 0.80 | 0.80 | 0.80 | 0.80 |
| Angle θ7 of First straight line of Main body portion [degree] | 48 | 40 | 35 | 45 | 40 | 40 | 40 | 40 |
| Angle θ8 of Second straight line of Main body portion [degree] | 55 | 50 | 50 | 50 | 45 | 55 | 50 | 50 |
| Angle θ9 of Third straight line of Main body portion [degree] | 65 | 75 | 75 | 75 | 75 | 75 | 70 | 80 |
| Steering stability on Dry road surface [evaluation point] | 100 | 109 | 106 | 108 | 107 | 108 | 107 | 108 |
| On-snow performance [evaluation point] | 100 | 100 | 101 | 100 | 101 | 100 | 100 | 100 |

From the test results, it was confirmed that the tires as the Examples in the embodiment shown in FIG. 7 exerted excellent steering stability on a dry road surface as compared with the winter tire as the Reference. Further, it was confirmed that the tires as the Examples mentioned above had the on-snow performance as same level as that of the winter tire as the Reference.

The invention claimed is:

1. A tire comprising a tread portion comprising
a plurality of first oblique grooves extending obliquely from a first tread edge positioned on one side in a tire axial direction toward a tire equator, wherein
each of the first oblique grooves comprises a main body portion extending from the first tread edge without reaching the tire equator and a branch portion branching off from the main body portion and extending to cross the tire equator,
the branch portion terminates without being connected with other grooves than the first oblique grooves, and
at a portion where the branch portion branches off from the main body portion, an angle between a groove center line of the branch portion and the groove centerline of a tip portion of the main body portion is 35 degrees or more and 45 degrees or less.

2. The tire according to claim 1, wherein
the tread portion further comprises a plurality of second oblique grooves extending from a second tread edge positioned on the other side in the tire axial direction toward the tire equator,
the branch portion terminates before reaching the second oblique grooves, and
a width of a spacing portion between an end portion of the branch portion and its adjacent one of the second oblique grooves is smaller than a groove width of the branch portion.

3. The tire according to claim 2, wherein
the spacing portion is provided with a sipe connecting between the branch portion and its adjacent one of the second oblique grooves and having a width less than 1.5 mm.

4. The tire according to claim 1, wherein
the tread portion further comprises a center land region, and
the center land region extends continuously in a tire circumferential direction without being divided by a groove having a width more than 1.5 mm.

5. The tire according to claim 1, wherein
the main body portion comprises a tip portion terminating before reaching the tire equator,
a tapered land region is defined at a corner portion located between the tip portion and the branch portion, and
the tapered land region has a chamfered portion inclined inwardly in a tire radial direction toward the corner portion.

6. The tire according to claim 1, wherein
in a cross section of the tire passing through a rotational axis thereof, the tread portion comprises a ground contacting surface and buttress surfaces disposed on both outer sides in the tire axial direction of the ground contacting surface, and
the ground contacting surface and each of the buttress surfaces are connected by an arcuate surface having a radius of curvature in a range of from 1 to 10 mm.

7. The tire according to claim 1, wherein
the tread portion is provided with a longitudinal sipe extending parallel with the tire circumferential direction from the branch portion.

8. The tire according to claim 7, wherein
the longitudinal sipe has one end connected to the branch portion and the other end terminating without being connected with any other grooves and sipes.

9. The tire according to claim 7, wherein
the longitudinal sipe has a length in the tire circumferential direction smaller than the groove width of the branch portion.

10. The tire according to claim 1, wherein
a tip of the main body portion is inclined at an angle in a range of from 70 to 80 degrees with respect to the tire axial direction.

11. The tire according to claim 1, wherein
the tread portion further comprises a shoulder block defined between the plurality of the first oblique grooves and arranged closest to the first tread edge,
the shoulder block is provided with a longitudinal closed sipe which extends in the tire circumferential direction and has both ends terminating within the block.

12. The tire according to claim 1, wherein
a tip portion of the main body portion is inclined to the same side as the branch portion with respect to the tire circumferential direction and the tire axial direction, and
the tip portion is a portion of the main body portion positioned opposite to the first tread edge from a branch-off portion where the branch portion branches off from the main body portion.

13. The tire according to claim 12, wherein a distance (L1) in the tire axial direction between an end of the tip portion and the tire equator is 1.0% or more and 3.0 or less of a tread width.

14. The tire according to claim 12, wherein an angle $\theta 2$ of the branch portion is 15 degrees or more and 30 degrees or less with respect to the tire axial direction.

15. The tire according to claim 12, wherein
a distance (L2) in the tire axial direction between a first intersection point and the tire equator is 3.0% or more and 5.0% or less of the tread width, and
the first intersection point is an intersection point of a groove center line of the main body portion and an extension line of a groove center line of the branch portion.

16. The tire according to claim 12, wherein a groove width (W2) of the branch portion is 0.50 times or more and 0.60 times or less a maximum groove width (W1) of the main body portion.

17. The tire according to claim 2, wherein the width of the spacing portion is 0.70 times or more and 0.90 times or less the groove width of the branch portion.

18. The tire according to claim 1, wherein
the branch portion has a smaller depth than the main body portion, and
the depth of the branch portion is 5.0 mm or more and 10.0 mm or less.

19. The tire according to claim 5, wherein the chamfered portion is inclined at an angle of 40 degrees or more and 50 degrees or less with respect to the tire radial direction.

20. A tire comprising a tread portion comprising
a plurality of first oblique grooves extending obliquely from a first tread edge positioned on one side in a tire axial direction toward a tire equator, wherein
each of the first oblique grooves comprises a main body portion extending from the first tread edge without reaching the tire equator and a branch portion branching off from the main body portion and extending to cross the tire equator,
the branch portion terminates without being connected with other grooves than the first oblique grooves, and
the tread portion is provided with a longitudinal sipe extending parallel with the tire circumferential direction from the branch portion.

* * * * *